(12) United States Patent
Fukumoto

(10) Patent No.: US 6,356,575 B1
(45) Date of Patent: Mar. 12, 2002

(54) DUAL CAVITY MULTIFUNCTION LASER SYSTEM

(75) Inventor: Joseph M. Fukumoto, Rancho Palos Verdes, CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/347,661

(22) Filed: Jul. 6, 1999

(51) Int. Cl.$^7$ ................................................ H01S 3/082

(52) U.S. Cl. ........................................................ 372/97

(58) Field of Search ............................... 372/97, 98, 92

(56) References Cited

U.S. PATENT DOCUMENTS 3,622,911 A * 11/1971 Marcatilli et al. ......... 331/94.5
4,796,262 A * 1/1989 Michelangeli et al. ......... 372/9
5,822,355 A * 10/1998 Ahn et al. ..................... 372/97

OTHER PUBLICATIONS

Armandillo et al., Diode–pumped high–efficiency high–brightness Q–switched ND:YAG slab laser, Aug. 1, 1997, Optics Letters, vol. 22, No. 15, pp. 1168–1170.*

* cited by examiner

Primary Examiner—Paul Dzierzynski
Assistant Examiner—Jeffrey Zahn
(74) Attorney, Agent, or Firm—Colin M. Raufer; Leonard A. Alkov; Glenn H. Lenzen, Jr.

(57) ABSTRACT

A dual cavity multifunction laser comprising a diode-pumped, contact cooled, slab laser head that supports two different length unstable resonators. The laser produces short (<8 ns), low energy 1 $\mu$m pulses or long (>15 ns), higher energy 1 $\mu$m pulses from the same laser system at different repetition rates, if desired. The output from each resonator can be separately optimized for different operating modes such as target designation and target profiling. The unstable resonators use independently optimized super Gaussian output couplers to generate high quality beams for each of the high and low pulse energy modes. The resonators also share a common bounce path to minimize intracavity losses and thermally induced birefringence for both resonators.

17 Claims, 3 Drawing Sheets

DUAL CAVITY MULTIFUNCTION LASER SYSTEM

BACKGROUND

The present invention relates generally to laser systems, and more particularly, to an improved dual cavity multifunction laser system.

In typical single resonator lasers, it is difficult to produce the combination of short, low energy and long, high energy pulses from the same resonator. This is because high gain (high energy) systems typically produce short pulses and low gain (lower energy) systems typically produce longer pulses. It has been determined that by using two different length resonators with identical bounce paths through the slab, Brewster face losses and thermally induced birefringence can be minimized for both resonators. In addition, both resonators can share common optical components such as an electro-optical Q-switch, hold off polarizer, rear reflector, and compensating cylindrical len(s). These shared components do not have to be replicated for each resonator and thus reduce system cost and complexity.

A recent publication, "Diode-pumped high-efficiency high-brightness Q-switched Nd:YAG slab laser," by E. Armandillo, et al., Opt. Lett., 22, 1168–1170 (1997), describes the performance of a contact cooled, diode-pumped slab laser using an unstable resonator with a Gaussian reflectivity output coupler. These authors do not disclose or suggest a resonator that uses a dual cavity, shared gain region resonator approach which allows the generation of two distinct pulse widths from the same gain medium, a polarization selection strategy to differentiate the two resonator paths, a variable diode-to-slab optical coupling system which allows variable diode pump light distribution within the slab, or super Gaussian reflectivity output couplers to tailor output laser beam transverse profiles for optimized nonlinear conversion of external converters (e.g., KTA, KTP (OPOs), frequency doubling crystals, etc.).

It would therefore be desirable to have a dual cavity multifunction laser system that improves upon conventional designs.

SUMMARY OF THE INVENTION

The present invention provides for a dual cavity multifunction laser comprising a diode-pumped, contact cooled, slab laser head that supports two different length unstable resonators. In its basic form, the dual cavity multifunction laser comprises a common rear reflector, an electro-optical Q-switch, a first gain medium, a halfwave plate, and a cavity switching polarizer. These components are common to both cavities. A short cavity is provided that outputs a high repetition rate, low pulse energy output beam that includes these basic components along with a short cavity super Gaussian output coupler that defines the length of the short cavity. A correcting cylindrical lens is employed that is specific to the short cavity. A long cavity is provided that outputs a low repetition rate, high pulse energy output beam and includes the basic components along with a long cavity super Gaussian output coupler that defines the length of the long cavity. The output of the long cavity may be coupled to an external amplifier gain medium by way of a halfwave plate and an optical isolator to produce the low repetition rate, high pulse energy output beam that may be used for designator purposes, for example.

The dual cavity multifunction laser produces short (<8 ns), low energy 1 $\mu$m pulses or long (>15 ns), higher energy 1 $\mu$m pulses from the same laser head at different repetition rates, if desired. The utility of two distinct pulse widths, pulse energies, and repetition rates is that the output from each resonator can be separately optimized for different operating modes (e.g., target designation and target profiling). The unstable resonators use independently optimized super Gaussian output couplers to generate high quality beams for each of the high and low pulse energy modes. The resonators also share a common bounce path through the slab laser head to minimize intracavity losses and thermally induced birefringence for both resonators.

The dual cavity multifunction laser system produces, from a single laser system, both high energy, relatively long (>15 ns) pulses and low energy, short (<8 ns) pulses, which is extremely difficult from a single resonator laser system. These distinct pulse widths, pulse energies, and repetition rates can be used to optimize separate functions, such as for target designation and target profiling.

Advantages of the dual cavity multifunction laser are that it has lower system costs (relative to two independent lasers) due to shared laser slab, pump diodes, diode coupling optics, the electro-optical Q-switch, hold off polarizer, rear reflector, and compensating cylindrical len(s). The present laser has the ability to produce varying pulse widths, pulse energies, repetition rates, and different high quality beam profiles from a single laser system. The present laser provides two distinct output beams for pumping separate nonlinear frequency conversion devices, if desired. The present laser also has a reduced parts count and complexity relative to two independent lasers.

The dual cavity, multifunction laser system may be used as a laser device for a multitude of multifunction laser applications that require mutifunctionality from a single laser system.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
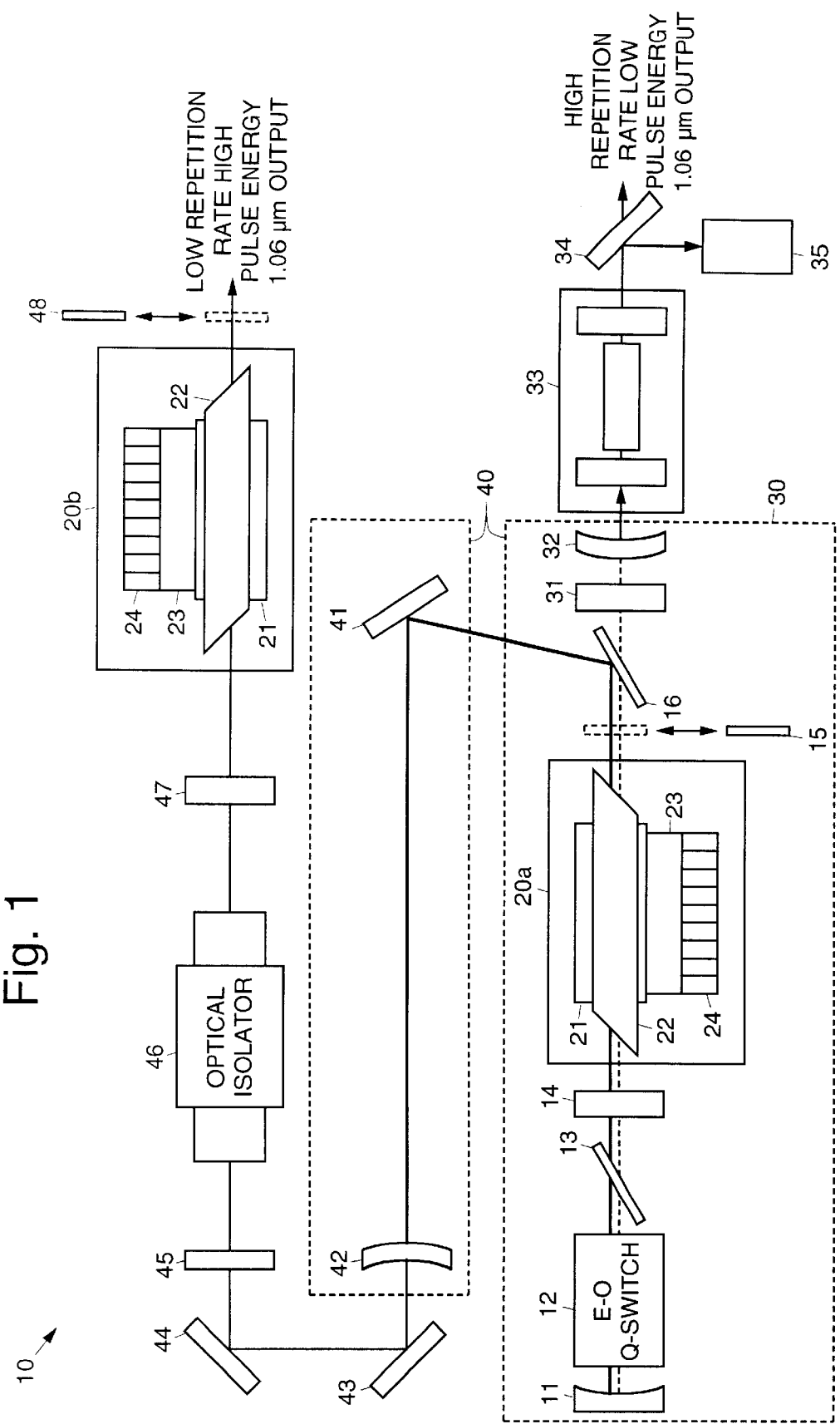
FIG. 1 illustrates an exemplary dual cavity laser in accordance with the principles of the present invention.

Referring to the drawing figures, FIG. 1 illustrates an exemplary dual cavity multifunction laser 10 in accordance with the principles of the present invention. The exemplary dual cavity multifunction laser 10 comprises a dual cavity (Nd:YAG slab) oscillator-amplifier 10 that includes short and long cavities 30, 40.

The exemplary dual cavity multifunction laser 10 includes a common rear 1.06 $\mu$m reflector 11, an electro-optical Q-switch 12 disposed adjacent to the rear reflector 11, a hold-off polarizer 13, a common path correcting cylindrical lens 14, a first Nd:YAG slab gain medium 20a comprising an oscillator head 20a, a 1.06 $\mu$m halfwave plate 15, and a cavity switching device 16, such as a cavity switching polarizer 16. The first Nd:YAG slab gain medium 20a or oscillator head 20a may comprise a direct contact slab cooler 21, a variable stack-to-slab optical coupler 23, a Nd:YAG slab 22, and a diode stack 24.

The short cavity 30, in addition to the above-mentioned common components, includes a short cavity correcting cylindrical lens 31 and a short cavity super Gaussian output coupler 32. The output of the short cavity 30 is coupled to a nonlinear crystal 33, such as a KTA OPO or other crystal 33, for example. The nonlinear crystal 33 produces a high repetition rate low pulse energy 1.5 μm output beam and a 3.5 μm output beam. An output reflecting mirror 34 separates the energy at the 1.5 μm and 3.5 μm wavelengths and reflects the 3.5 μm energy to a 3.5 μm dump 35 or absorber 35. The 1.5 μm energy is output as an eyesafe laser beam from the dual cavity multifunction laser 10.

The long cavity 40, in addition to the common components, comprises a long cavity super Gaussian output coupler 42. The 1.06 μm halfwave plate 15 is inserted in the optical path when the long cavity operation is desired. The output of the long cavity 40 is further amplified by an external amplifier head 20b to produce a low repetition rate high pulse energy 1.06 μm output beam from the dual cavity multifunction laser 10.

A cavity fold mirror 41 and first and second steering mirrors 43, 44 may be disposed along the output path of the long cavity 40 to make the dual cavity multifunction laser 10 more compact.

To interface with the external amplifier head 20b, a halfwave plate 45, an optical isolator 46, an amplifier correcting cylindrical lens 47, the amplifier head 20b, and an eyesafe interlock mechanism 48 are disposed along the output path of the long cavity 40. The eyesafe interlock mechanism 48 is inserted into the optical path when 1.5 μm eyesafe laser operation is desired. The amplifier head 20b or second Nd:YAG slab gain medium 20b may also comprise a direct contact slab cooler 21, a variable stack-to-slab optical coupler 23, a Nd:YAG slab 22, and a diode stack 24.

In the dual cavity multifunction laser 10, both cavities 30, 40 share the rear reflector 11, the electro-optical Q-switch 12, the hold-off polarizer 13, the common path correcting cylindrical lens 14, and the first Nd:YAG slab gain medium 20a. When short pulse operation is desired for target profile/terrain mapping or obstacle avoidance/rangefinder modes, for example, the halfwave plate 15 is removed from the cavity, and a horizontally polarized beam is transmitted through the cavity switching polarizer 16 to the short cavity super Gaussian output coupler 32. If desired, the resulting 5–8 ns 1.06 μm pulses may be used to pump the KTA OPO nonlinear crystal 33 to provide 1.5 μm short pulse generation.

For long pulse generation, the halfwave plate 16 is inserted into the cavity 30 which causes rotation of the horizontally polarized beam to a vertical orientation, which is then reflected off the cavity switching polarizer 16 to the long cavity super Gaussian output coupler 42. Because of the longer cavity length of the long cavity 40, a 15–20 ns 1.06 μm pulse is generated for designation purposes, or example. In an alternative embodiment, the removable halfwave plate 16 may be replaced by a Pockels cell, or by another type of optical switch in order to control cavity selection.

The use of unstable resonators does not easily allow straightforward cavity elongation, and hence each cavity 30, 40 is independently optimized for extraction efficiency and beam profile quality by varying the curvature of the respective output couplers 32, 42 and the respective super Gaussian profile. The primary advantage of using two cavities 30, 40 is that each cavity 30, 40 can be optimized for its specific mission. In particular, the temporal and transverse spatial profile of the beam from the short cavity 30 can be tailored (as flat-topped as possible) for the sole purpose of efficiently pumping an eyesafe nonlinear OPO crystal 33, without having the additional burden of serving as a high quality, long pulse designation beam. After conversion to 1.5 μm, the profile/rangefinding beam can be combined with the 1.06 μm designation beam to provide for collinear output.

As an option, the system 10 shown in FIG. 1 may use the slab amplifier 20 to provide for the long cavity (designator mode) output since the resulting 15–20 ns pulse can be specified at greater than 300 mJ. The first and second steering mirrors 43, 44 direct the output of the long cavity 40 into the single pass slab amplifier head 20b through a halfwave plate 45 (to rotate the vertical output to the horizontal) and the optical isolator 46. The corrective cylindrical lens 47 for the amplifier head 20b removes vertical thermal lensing in the amplifier head 20b so that the resultant amplified beam is free of astigmatism.

Figure 2:
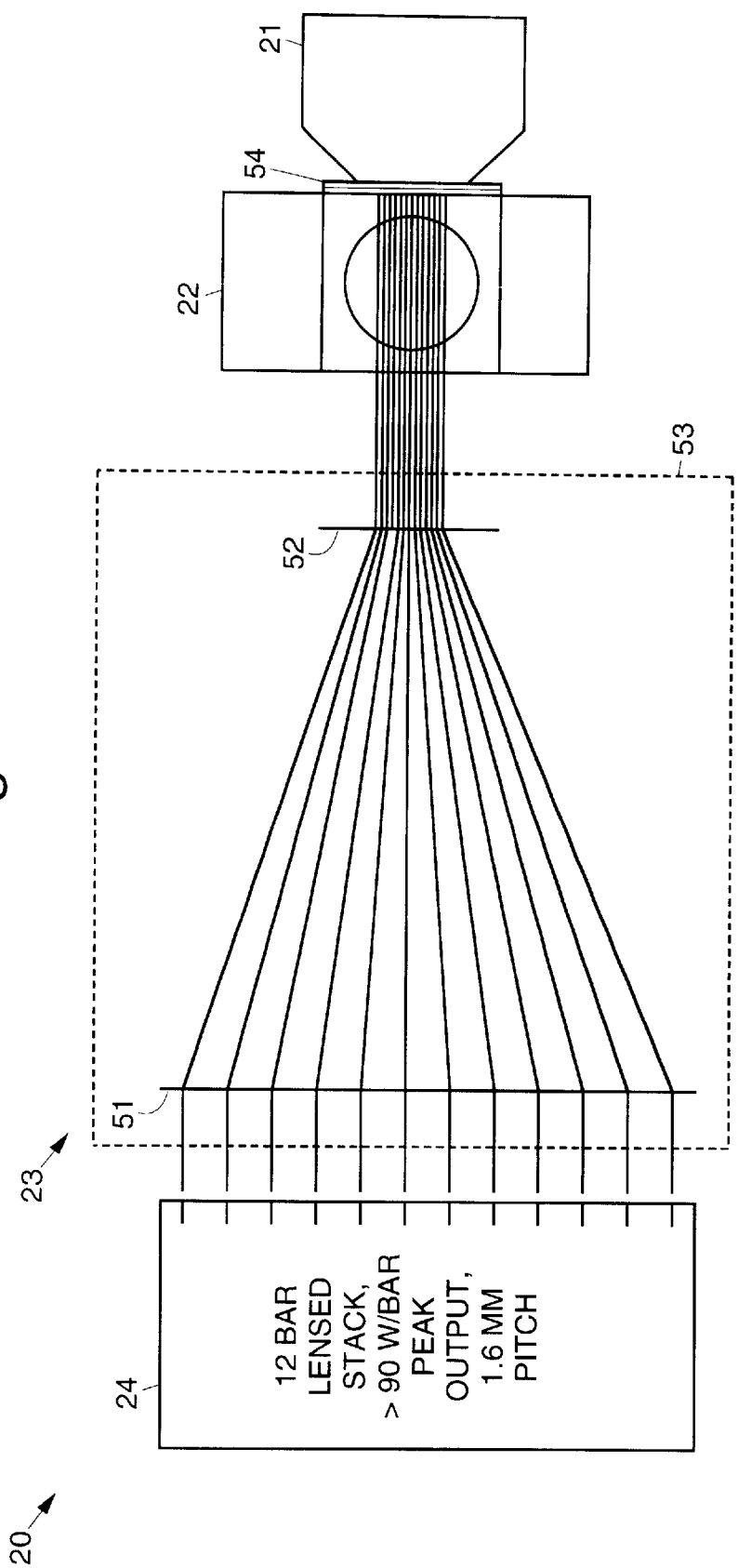
FIG. 2 illustrates a first exemplary variable stack-to-slab optical coupling scheme for use in the laser of FIG. 1.
Figure 3:
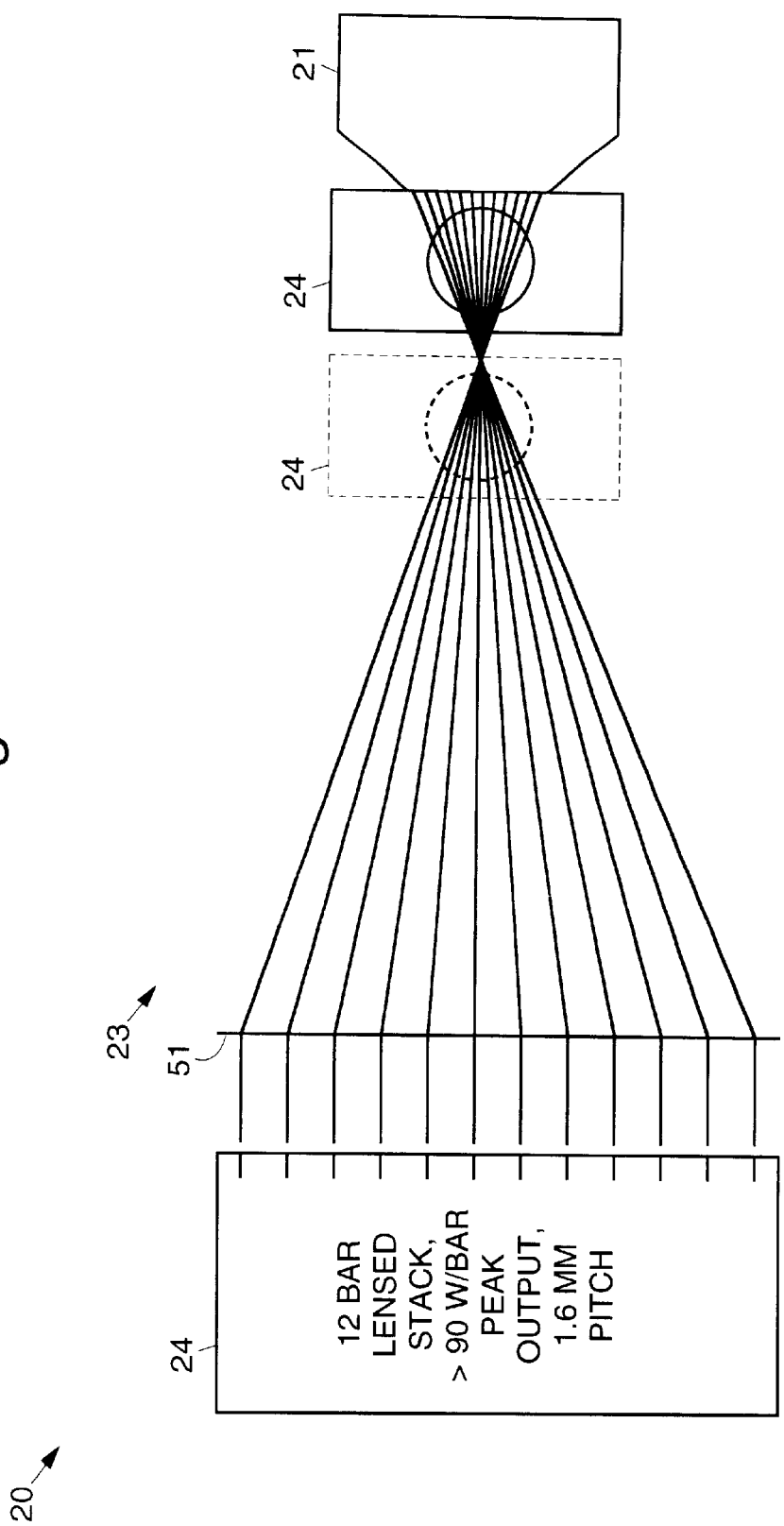
FIG. 3 illustrates a second exemplary variable stack-to-slab optical coupling scheme for use in the laser of FIG. 1.

Shown in FIGS. 2 and 3 are two possible embodiments for implementing the variable stack-to-slab optical coupler 23 shown in FIG. 1. In FIG. 2, two cylindrical lenses 51, 52 form a cylindrical telescope 53 to reduce the vertical extent of the output of the diode stack 24. The quasi-collimated sheets of diode pump light are condensed in the vertical direction so that the diode bars can be separated by an appropriate distance (1.6 mm pitch in FIG. 2) in order to cool them sufficiently for high duty cycle operation, if necessary. Spherical optics or cylindrical lenses may also be used as part of the variable optical coupler 23 if lens power is required to condense the horizontal direction of the output of the diode stack 24.

In a more common "close coupled" arrangement, where unlensed diode stack 24 is positioned very close or directly next to the slab 22, the diode pump density and stack duty factor operational limit is determined primarily by the bar pitch. Typically, the pitch is limited to 400 μm spacing in order to attain high pump densities. However, a 400 μm spacing usually limits pulsed diode stacks 24 to less than 3% duty factor due to insufficient cooling channel spacing.

FIG. 2 illustrates a first embodiment of the variable diode stack-to-slab optical coupler 23 which employs the cylindrical telescope 53. The output from the diode stack 24 can be condensed to underfill the anticipated TEM$_{00}$ mode cross section for good output beam quality. The bounce face of the slab 22 that is cooled is coated with a multiple layer insulating coating 54 comprising an evanescent wave insulating layer followed by an 808 nm high reflector dielectric stack coating for double passing the diode pump light. A final capping layer (e.g., SiO$_2$) is deposited onto the high reflector dielectric stack coating for added durability and reversible contacting. The opposite bounce face is anti-reflection coated at 808 nm for low diode pump light loss.

FIG. 3 illustrates a second embodiment of the variable diode stack-to-slab optical coupler 23 which employs a single cylindrical lens 51. The slab-to-cylindrical lens distance can be varied in order to produce the optimal pump distribution for TEM$_{00}$ mode output. A second cylindrical lens may be placed between the diode stack 24 and slab 22 in order to condense the horizontal direction of the pump light if required.

The variable diode stack-to-slab optical coupler 23 allows both large spacing between diode bars for high duty factor operation, and variable pump density distributions to minimize higher order mode output and optimize beam quality. Furthermore, thermally induced birefringence may be minimized by a careful choice of diode pump light distribution within the slab 22 and placement of the contact cooler 21. The ability to optimize pump light distribution is severely limited in the traditional "close coupled" approach due to the fixed diode bar pitch and highly divergent diode bar output.

The present dual cavity multifunction laser 10 uses dual laser cavities 30, 40 for optimum multifunction performance. The laser 10 provides a direct, low risk implementation for producing naturally conflicting high energy, >15 ns pulses together with lower energy, <8 ns pulses from the same gain medium. The laser 10 can rapidly switch between operating modes with widely different powers without sacrificing beam quality or efficiency.

The laser 10 uses an unstable resonator with super Gaussian output couplers 32, 42 for near diffraction-limited beam quality with efficient extraction of large cross-section gain regions. This reduces intracavity damage risk due to stable lowest order transverse mode operation. The laser 10 generates high quality fundamental mode output due to significant higher order transverse mode discrimination. The laser 10 produces "tailorable" flat-topped beam profile for efficient OPO conversion and high quality eyesafe output.

The laser 10 uses a variable optically-coupled, contact cooled slab amplifier (pump) head 20b which maintains excellent beam quality at high average power levels due to well-managed thermally-induced birefringence. Diode pump light distribution is controllable to support best quality beam. Pump density not limited to standard diode stack pitch spacings. The laser 10 allows integration of very high duty cycle pulsed diode pumping (currently up to 50% duty) without affecting pump density or pump distribution.

Thus, an improved dual cavity multifunction laser system has been disclosed. It is to be understood that the above-described embodiment is merely illustrative of one of the many specific embodiments that represent applications of the principles of the present invention. Clearly, numerous and other arrangements can be readily devised by those skilled in the art without departing from the scope of the invention.

What is claimed is:

1. A dual cavity multifunction laser having first and second cavities, comprising:
   a common rear reflector disposed at a rear end of the first and second cavities;
   an electro-optical Q-switch disposed along a common optical path of the first and second cavities that includes the common rear reflector;
   a hold-off polarizer disposed along the common optical path;
   a first gain medium disposed along the common optical path;
   a laser pumping device to pump the first gain medium;
   a cavity switching polarizer disposed along the common optical path;
   a first cavity super Gaussian output coupler disposed at an output end of the first cavity that outputs a high repetition rate, low pulse energy output beam;
   a second cavity super Gaussian output coupler disposed at an output end of the second cavity that outputs a low repetition rate, high pulse energy output beam; and
   a halfwave plate selectively disposed between the first and second cavities when second cavity output is desired.

2. The laser recited in claim 1 further comprising:
   a first cavity correcting cylindrical lens disposed along an optical path of the first cavity;
   a nonlinear crystal disposed along an optical path of the first cavity; and
   an output reflecting mirror disposed along an optical path of the first cavity that outputs the high repetition rate, low pulse energy output beam.

3. The laser recited in claim 1 further comprising:
   a halfwave plate disposed along an optical path of the second cavity;
   an optical isolator disposed along the optical path of the second cavity;
   an amplifier correcting cylindrical lens disposed along the optical path of the second cavity; and
   a second gain medium disposed along the optical path of the second cavity that outputs the low repetition rate, high pulse energy output beam.

4. The laser recited in claim 1 wherein the first gain medium comprises a first Nd:YAG slab gain medium.

5. The laser recited in claim 4 wherein the first Nd:YAG slab gain medium comprises a direct contact slab cooler, a variable stack-to-slab optical coupler, a Nd:YAG slab, and a diode stack.

6. The laser recited in claim 3 wherein the second gain medium comprises a second Nd:YAG slab gain medium.

7. The laser recited in claim 6 wherein the second Nd:YAG slab gain medium comprises a direct contact slab cooler, a variable stack-to-slab optical coupler, a Nd:YAG slab, and a diode stack.

8. The laser recited in claim 1 wherein the nonlinear crystal comprises an OPO crystal.

9. The laser recited in claim 1 wherein the common rear reflector comprises a 1.06 $\mu$m reflector.

10. The laser recited in claim 1 further comprising a common path correcting cylindrical lens disposed between the electro-optical Q-switch and the first gain medium.

11. The laser recited in claim 1 wherein the halfwave plate comprises a 1.06 $\mu$m halfwave plate.

12. The laser recited in claim 2 wherein the short cavity further comprises a 3.5 $\mu$m dump coupled to the output reflecting mirror.

13. The laser recited in claim 1 further comprising a folding mirror and first and second steering mirrors disposed along the optical path of the second cavity.

14. The laser recited in claim 1 further comprising an eyesafe interlock mechanism disposed along the output path of the second cavity.

15. The laser recited in claim 5 wherein the variable stack-to-slab optical coupler comprises a cylindrical telescope.

16. The laser recited in claim 5 wherein a bounce face of the slab that is cooled is coated with a multiple layer insulating coating comprising an evanescent wave insulating layer, a high reflector dielectric stack coating, a capping layer deposited onto the high reflector dielectric stack coating; and wherein an opposite bounce face is anti-reflection coated.

17. The laser recited in 5 wherein the variable stack-to-slab optical coupler comprises a single cylindrical lens.

* * * * *